United States Patent
Joshi et al.

(10) Patent No.: US 9,209,445 B2
(45) Date of Patent: *Dec. 8, 2015

(54) NICKEL-METAL HYDRIDE/HYDROGEN HYBRID BATTERY USING ALKALI ION CONDUCTING SEPARATOR

(75) Inventors: Ashok V. Joshi, Salt Lake City, UT (US); John Howard Gordon, Salt Lake City, UT (US); Sai Bhavaraja, West Jordan, UT (US)

(73) Assignee: CERAMATEC, INC., Salt Lake City, UT (US)

(*) Notice: Subject to any disclaimer, the term of this patent is extended or adjusted under 35 U.S.C. 154(b) by 834 days.

This patent is subject to a terminal disclaimer.

(21) Appl. No.: 13/364,169

(22) Filed: Feb. 1, 2012

(65) Prior Publication Data

US 2012/0126752 A1   May 24, 2012

Related U.S. Application Data

(60) Continuation-in-part of application No. 11/944,719, filed on Nov. 26, 2007, now Pat. No. 8,012,621, and a continuation-in-part of application No. 13/189,176, filed on Jul. 22, 2011, now Pat. No. 8,159,192, and a continuation-in-part of application No. 13/189,177, filed on Jul. 22, 2011, now Pat. No. 8,722,221, which is a division of application No. 11/944,719.

(60) Provisional application No. 61/438,328, filed on Feb. 1, 2011.

(51) Int. Cl.
   *H01M 10/26* (2006.01)
   *H01M 2/16* (2006.01)
   *H01M 4/58* (2010.01)
   (Continued)

(52) U.S. Cl.
   CPC .......... *H01M 2/1646* (2013.01); *H01M 2/1653* (2013.01); *H01M 2/1686* (2013.01); *H01M 4/92* (2013.01); *H01M 10/345* (2013.01); *H01M 10/44* (2013.01); *H01M 12/08* (2013.01); *H01M 2300/0014* (2013.01); *Y02E 60/124* (2013.01); *Y02E 60/50* (2013.01)

(58) Field of Classification Search
   None
   See application file for complete search history.

(56) References Cited

U.S. PATENT DOCUMENTS

| | | |
|---|---|---|
| 1,501,756 A | 7/1924 | Downs |
| 3,660,170 A | 5/1972 | Rampel |

(Continued)

FOREIGN PATENT DOCUMENTS

| | | |
|---|---|---|
| JP | 59-75985 | 4/1984 |
| JP | 07-282860 | 10/1995 |

(Continued)

OTHER PUBLICATIONS

Feng et al. "Electrochemical behaviour of intermetallic-based metal hydrides used in Ni/metal hydride (MH) batteries: a review", International Journal of Hydrogen Energy 26 (2001) pp. 725-734.*

(Continued)

*Primary Examiner* — Gregg Cantelmo
(74) *Attorney, Agent, or Firm* — David Fonda

(57) ABSTRACT

A nickel-metal hydride (hydrogen) hybrid storage battery comprising a positive electrode containing nickel hydroxide, a combination negative electrode containing a hydrogen storage alloy electrode and a reversible hydrogen electrode, an alkaline electrolyte, and an alkali conducting separator disposed between the positive electrode and the negative electrode. The alkali conducting separator may be a substantially non-porous ion conducting material wherein the alkali conducted is Na, K, or Li. A method of charging and discharging such a hybrid battery is also disclosed.

22 Claims, 2 Drawing Sheets

(51) Int. Cl.
*H01M 10/34* (2006.01)
*H01M 10/44* (2006.01)
*H01M 4/92* (2006.01)
*H01M 12/08* (2006.01)

(56) References Cited

U.S. PATENT DOCUMENTS

| | | |
|---|---|---|
| 3,785,965 A | 1/1974 | Welty |
| 3,787,315 A | 1/1974 | Bearden, Jr. et al. |
| 3,788,978 A | 1/1974 | Bearden, Jr. et al. |
| 3,791,966 A | 2/1974 | Bearden |
| 3,970,472 A | 7/1976 | Steffensen |
| 4,053,371 A | 10/1977 | Towsley |
| 4,076,613 A | 2/1978 | Bearden, Jr. |
| 4,207,391 A | 6/1980 | Church et al. |
| 4,298,666 A | 11/1981 | Taskier |
| 4,307,164 A | 12/1981 | Church et al. |
| 4,372,823 A | 2/1983 | Church et al. |
| 4,465,744 A | 8/1984 | Susman et al. |
| 4,479,856 A | 10/1984 | Ando |
| 4,542,444 A | 9/1985 | Boland |
| 4,546,055 A | 10/1985 | Coetzer et al. |
| 4,623,597 A | 11/1986 | Sapru et al. |
| 4,842,963 A | 6/1989 | Ross, Jr. et al. |
| 5,057,206 A | 10/1991 | Engel et al. |
| 5,213,908 A | 5/1993 | Hagedorn |
| 5,290,405 A | 3/1994 | Joshi et al. |
| 5,342,709 A | 8/1994 | Yahnke et al. |
| 5,516,598 A | 5/1996 | Visco et al. |
| 5,525,442 A | 6/1996 | Shuster |
| 5,541,019 A | 7/1996 | Anani et al. |
| 5,580,430 A | 12/1996 | Balagopal et al. |
| 5,674,639 A | 10/1997 | Urry |
| 5,695,632 A | 12/1997 | Brons et al. |
| 5,780,186 A | 7/1998 | Casey, Jr. |
| 5,856,047 A | 1/1999 | Venkatesan et al. |
| 5,882,812 A | 3/1999 | Visco et al. |
| 5,935,421 A | 8/1999 | Brons et al. |
| 6,017,651 A | 1/2000 | Nimon et al. |
| 6,025,094 A | 2/2000 | Visco et al. |
| 6,030,720 A | 2/2000 | Chu et al. |
| 6,110,236 A | 8/2000 | Tsang et al. |
| 6,153,328 A | 11/2000 | Colborn |
| 6,159,634 A | 12/2000 | Yen et al. |
| 6,165,644 A | 12/2000 | Nimon et al. |
| 6,200,704 B1 | 3/2001 | Katz et al. |
| 6,210,564 B1 | 4/2001 | Brons et al. |
| 6,210,832 B1 | 4/2001 | Visco et al. |
| 6,214,061 B1 | 4/2001 | Visco et al. |
| 6,225,002 B1 | 5/2001 | Nimon et al. |
| 6,248,476 B1 | 6/2001 | Sun et al. |
| 6,248,481 B1 | 6/2001 | Visco et al. |
| 6,265,100 B1 | 7/2001 | Saaski et al. |
| 6,291,090 B1 | 9/2001 | Kuznetsov et al. |
| 6,310,960 B1 | 10/2001 | Saaski et al. |
| 6,355,379 B1 | 3/2002 | Ohshita et al. |
| 6,358,643 B1 | 3/2002 | Katz et al. |
| 6,368,486 B1 | 4/2002 | Thompson et al. |
| 6,376,123 B1 | 4/2002 | Chu |
| 6,402,795 B1 | 6/2002 | Chu et al. |
| 6,413,284 B1 | 7/2002 | Chu et al. |
| 6,413,285 B1 | 7/2002 | Chu et al. |
| 6,416,903 B1 | 7/2002 | Fierro et al. |
| 6,432,584 B1 | 8/2002 | Visco et al. |
| 6,537,701 B1 | 3/2003 | Nimon et al. |
| 6,610,440 B1 | 8/2003 | LaFollette et al. |
| 6,632,573 B1 | 10/2003 | Nimon et al. |
| 6,737,197 B2 | 5/2004 | Chu et al. |
| 6,787,019 B2 | 9/2004 | Jacobson et al. |
| 6,852,450 B2 | 2/2005 | Hwang et al. |
| 6,881,234 B2 | 4/2005 | Towsley |
| 6,911,280 B1 | 6/2005 | De Jonghe et al. |
| 6,955,753 B1 | 10/2005 | Gomez |
| 6,955,866 B2 | 10/2005 | Nimon et al. |
| 6,991,662 B2 | 1/2006 | Visco et al. |
| 7,070,632 B1 | 7/2006 | Visco et al. |
| 7,144,654 B2 | 12/2006 | LaFollette et al. |
| 7,166,384 B2 | 1/2007 | LaFollette et al. |
| 7,214,443 B2 | 5/2007 | Clarke et al. |
| 7,259,126 B2 | 8/2007 | Gordon et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,390,591 B2 | 6/2008 | Visco et al. |
| 7,432,017 B2 | 10/2008 | Visco et al. |
| 7,482,096 B2 | 1/2009 | De Jonghe et al. |
| 7,491,458 B2 | 2/2009 | Visco et al. |
| 2002/0150818 A1 | 10/2002 | Amatucci et al. |
| 2004/0197641 A1 | 10/2004 | Visco et al. |
| 2004/0229107 A1 | 11/2004 | Smedley |
| 2005/0054525 A1 | 3/2005 | Ovshinsky et al. |
| 2005/0064274 A1 | 3/2005 | Reichman et al. |
| 2005/0109617 A1 | 5/2005 | Ono et al. |
| 2005/0175890 A1 | 8/2005 | Tsutsumi et al. |
| 2005/0175894 A1 | 8/2005 | Visco et al. |
| 2005/0202290 A1* | 9/2005 | Merzougui et al. ............. 429/9 |
| 2006/0096893 A1 | 5/2006 | De Almeida et al. |
| 2006/0141346 A1 | 6/2006 | Gordon et al. |
| 2006/0177732 A1 | 8/2006 | Visco et al. |
| 2006/0257734 A1 | 11/2006 | Obata et al. |
| 2007/0048610 A1 | 3/2007 | Tsang |
| 2007/0172739 A1 | 7/2007 | Visco et al. |
| 2007/0221265 A1 | 9/2007 | Affinito et al. |
| 2007/0259235 A1 | 11/2007 | Jacobson et al. |
| 2008/0206642 A1* | 8/2008 | Niessen et al. ............. 429/218.2 |
| 2008/0268327 A1 | 10/2008 | Gordon et al. |
| 2009/0061288 A1 | 3/2009 | Gordon et al. |
| 2009/0134842 A1 | 5/2009 | Joshi et al. |
| 2009/0136830 A1 | 5/2009 | Gordon |
| 2010/0285372 A1 | 11/2010 | Lee et al. |

FOREIGN PATENT DOCUMENTS

| | | |
|---|---|---|
| JP | 08321322 A | 12/1996 |
| JP | 2001-307709 | 11/2001 |
| JP | 2002-245847 A | 8/2002 |
| KR | 20070021110 A | 2/2007 |
| WO | WO2005038953 | 4/2005 |

OTHER PUBLICATIONS

Parsons, Thomas H., "Final Office Action", U.S. Appl. No. 12/022,381, (Oct. 23, 2013), 1-15.

Cantelmo, Gregg "Non-Final Office Action", U.S. Appl. No. 13/189,177, (Sep. 19, 2013), 1-9.

Cantelmo, Greg "Notice of Allowance", U.S. Appl. No. 13/189,177, (Jan. 8, 2014), 1-5.

Goodenough, J.B. et al., "Fast Na+-Ion Transport in Skeleton Structures", *Mat. Res. Bull.*, vol. 11, Pergamon Press, Inc. Printed in the United States, (1976), 203-220.

Hong, H.Y-P. et al., "Crystal Structures and Crystal Chemistry in the System $Na_{1+x}Zr_2Si_xP_{3-x}O_{12}$", *Mat. Res. Bull.*, vol. 11, 1976. Pergamon Press, Inc. Printed in the United States., (1976), 173-186.

Bentzen, J. J., et al., "The preparation and characterization of dense, highly conductive $Na_5GdSi_4O_{12}$ nasicon (NGS)", *Materials Research Bulletin*, vol. 15, (1980), 1737-1745.

Delmas, C. et al., "Crystal chemistry of the $Na_{1+x}Zr_{2-x}L_x(PO_4)_3$ (L = Cr, In, Yb) solid solutions", *Materials Research Bulletin*, vol. 16, (1981), 285-290.

Von Alpen, V. et al., "Compositional dependence of the electrochemical and structural parameters in the NASICON system $(Na_{1+x}Si_xZr_2P_{3-x}O_{12})$", *Solid State Ionics*, vol. 3/4, (1981), 215-218.

Fujitsu, S. et al., "Conduction paths in sintered ionic conductive material $Na_{1+x}Y_xZr_{2-x}(PO_4)_3$", *Materials Research Bulletin*, vol. 16, (1981), 1299-1309.

Saito, Y. et al., "Ionic Conductivity of NASICON-type conductors $Na_{1.5}M_{0.5}Zr_{1.5}(PO_4)_3$ (M: $Al^{3+}$, $Ga^{3+}$, $Cr^{3+}$, $Sc^{3+}$, $Fe^{3+}$, $In^{3+}$, $Yb^{3+}$, $Y^{3+}$)", *Solid State Ionics*, vol. 58, (1992), 327-331.

Alamo, J. "Chemistry and properties of solids with the [NZP] skeleton", *Solid State Ionics*, vol. 63-65, (1993), 547-561.

(56) References Cited

OTHER PUBLICATIONS

Shimazu, K. et al., "Electrical conductivity and Ti4+ ion substitution range in NASICON system", *Solid State Ionics*, vol. 79, (1995),106-110.

Miyajima, Y. et al., "Ionic conductivity of NASICON-type Na1+xMxZr2-xP3O12(M: Yb, Er, Dy)", *Solid State Ionics*, vol. 84,(1996),61-64.

Manickam, Minakshi et al., "Lithium insertion into manganese dioxide electrode in MnO2/Zn aqueous battery Part I. A preliminary study", *Journal of Power Sources*, vol. 130, Issues 1-2 (Obtained through ScienceDirect),(May 2004),254-259.

Sumathipala, et al., "Novel Li+ Ion Conductors and Mixed Conductors, Li3+xSixCr1-xO4 and a Simple Method for Estimating Li+/e–Transport Numbers", *J. Electrochem. Soc.*, vol. 142, No. 7,(Jul. 1995),2138-2143.

Kowalczk, et al., "Li-air batteries: A classic example of limitations owing to solubilities", *Pure Appl. Chem.*, vol. 79, No. 5,(2007),851-860.

Read, "Characterization of the Lithium/Oxygen Organic Electrolyte Battery", *J. Electrochem. Soc.*, vol. 149, No. 9,(2002),A1190-A1195.

Panero, et al., "High Voltage Lithium Polymer Cells Using a PAN-Based Composite Electrolyte", *J. Electrochem. Soc.*, vol. 149, No. 4,(2002),A414-A417.

Dissanayake, et al., "Lithium ion conducting Li4-2xGe1-xSxO4 solid electrolytes", *Solid State Ionics*, 62,(1993),217-223.

Balagopal, et al., "Selective sodium removal from aqueous waste streams with NaSICON ceramics", *Separation and Purification Technology*, 15,(1999),231-237.

Sagane, et al., "Li+ and Na+ transfer through interfaces between inorganic solid electrolytes and polymer or liquid electrolytes", *Journal of Power Sources*, 146,(2005),749-752.

Wang, et al., "LiTi2(PO4)3 with NASICON-type structure as lithium-storage materials", *Journal of Power Sources*, 124,(2003),231-236.

Dissanayake, et al., "New solid electrolytes and mixed conductors: Li3+xCr1-xMxO4: M = Ge, Ti", *Solid State Ionics*, 76,(1995),215-220.

Kerr, "Polymeric Electrolytes: An Overview", *Lithium Batteries: Science and Technology*, Chapter 19, edited by Nazri and Pistoia, Kluwer Academic Publishers,(2004),574-622.

Young, Lee W., "International Search Report", PCT Search Report for App. No. PCT/US 07/21978, (Oct. 10, 2008),1-2.

Young, Lee W., "Written Opinion of the International Searching Authority", PCT Written Opinion for App. No. PCT/US 07/21978, (Oct. 10, 2008),1-5.

Young, Lee W., "International Search Report", PCT Search Report for App.No. PCT/US 08/10435, (Nov. 25, 2008),1-2.

Young, Lee W., "Written Opinion of the International Searching Authority", PCT Written Opinion for App. No. PCT/US 08/10435, (Nov. 25, 2008),1-4.

Fu, "Effects of M3+ Ions on the Conductivity of Glasses and Glass-ceramics in the system Li2O-M2O3-GeO2-P2O5 (M = Al, Ga, Y, Dt, Gd, and La)", *Communications of the American Ceramic Society*, vol. 83, No. 4, (Apr. 2000),104-106.

Thokchom, et al., "Superionic Conductivity in a Lithium Aluminum Germanium Phosphate Glass-Ceramic", *Journal of the Electrochemical Society*, 155 (12), (Oct. 8, 2008),A915-A920.

Fu, "Fast Li+ Ion Conducting Glass Ceramics in the System Li2O-Al2O3-TiO2-P2O5", *Science Direct, Solid State Ionics*, vol. 104, Issues 3-4, (Dec. 11, 1997),191-194.

Saienga, et al., "The Comparative Structure, Property, and Ionic Conductivity of LiI + Li2S + GeS2 Glasses Doped with Ga2S3 and La2S3", *Journal of Non-Crystalline Solids*, vol. 354, 14, (Mar. 1, 2008),Abstract.

Wang, et al., "Polymer Composite Electrolytes Containing Active Mesoporous SiO2 Particles", *Journal of Applied Physics*, 102, (2007),1-6.

Wang, et al., "Li1.3Al0.3Ti1.7(PO4)3 Filler Effect on (PEO)LiClO4 Solid Polymer Electrode", *Department of Materials Science and Engineering*, Zhejiang University, (2004),Abstract.

Kim, "International Search Report", International App. No. PCT/US2008/084707, (Apr. 29, 2009),1-3.

Kim, "Written Opinion of the International Searching Authority", International App. No. PCT/US2008/084707, (Apr. 29, 2009),1-4.

Park, Jin "Written Opinion of the International Searching Authority Mailed on Jun. 30, 2009", Int. App. No. PCT/US2008/084572, (Jun. 30, 2009),1-3.

Park, Jin "International Search Report Mailed on Jun. 30, 2009", Int. App. No.PCT/US2008/084572, (Jun. 30, 2009),1-3.

Kim, Jun Hak "Written Opinion of the International Searching Authority Mailed on Aug. 24, 2009", Int. App. No. PCT/US2009/032458, (Aug. 24, 2009),1-4.

Kim, Jun Hak "International Search Report Mailed on Aug. 24, 2009", Int. App. No. PCT/US2009/032458, (Aug. 24, 2009),1-3.

Kim, Yeon-Gyeong "PCT International Search Report", Int. App. No. PCT/US2009/056781, (Mar. 2, 2010),1-4.

Kim, Yeon-Gyeong "PCT Written Opinion", Int. App. No. PCT/US2009/056781, (Mar. 2, 2010),1-3.

Armand, Michel et al., "ionic-liquid materials for the electrochemical challenges of the future", *Nature Materials*, (Jul. 24, 2009),621-629.

Doyle, Kevin P., et al., "Dentrite-Free Electrochemical Deposition of Li—Na Alloys from an Ionic Liquid Electrolyte", *Journal of The Electrochemical Society*,(May 2006),A1353-A1357.

Kim, K et al., "Electrochemical Investigation of Quaternary Ammonium/Aluminum Chloride Ionic Liquids", *Journal of The Electrochemical Society*, (Jun. 2004),A1168-A1172.

Kim, Ketack et al., "The Role of Additives in the Electroreduction of Sodium Ions in Chloroaluminate-Based Ionic Liquids", *Journal of The Electrochemical Society*, (Dec. 2004),E9-E13.

Lang, Christopher M., et al., "Cation Electrochemical Stability in Chloroaluminate Ionic Liquids", *J. Phys. Chem.*, (2005),19454-19462.

Salminen, Justin et al., "Ionic liquids for rechargeable lithium batteries", *Lawrence Berkeley National Laboratory*, (Sep 21),1-19.

Yoshimura, et al., "IPDL Machine Translation of JP-2001-307709", IPDL Machine Translation of JP-2001-307709, (Nov. 2, 2001),1-12.

Totsuka, Kazuhide "IPDL Machine Translation of JP08-321322A", IPDL Machine Translation of JP08-321322A, (Mar. 12, 1996),1-10.

Imanaka, Nobuhito "IPDL Machine Translation of JP 2002-245847 A", IPDL Machine Translation of JP 2002-245847 A, (Aug. 30, 2002),1-6.

Wu, Xian Ming et al., "Preparation and characterization of lithium-ion-conductive Li(1.3)Al(0.3)Tl(1.7)(PO4)3 thin films by the solution deposition", *Thin Solid Films 425*, (2003),103-107.

Parsons, Thomas H., "Office Action for U.S. Appl. No. 12/022,381", (May 24, 2011),1-11.

Cantelmo, Gregg "Office Action for U.S. Appl. No. 11/944,719", (Dec. 27, 2010),1-8.

Cullen, Sean P., "Office Action for U.S. Appl. No. 12/205,759", (Sep. 16, 2010),1-22.

Cullen, Sean P., "Office Action for U.S. Appl. No. 12/205,759", (Apr. 13, 2011),1-15.

Kalafut, Stephen J., "Office Action for U.S. Appl. No. 11/871,824", (Dec. 10, 2010),1-7.

Kalafut, Stephen J., "Office Action for U.S. Appl. No. 11/871,824", (May 25, 2010),1-8.

Apicella, Karie O., "Office Action for U.S. Appl. No. 12/323,165", (Jun. 1, 2011),1-10.

Lee, Kang Young "International Search Report", International App. No. PCT/US2010/055718, (Jun. 21, 2011),1-3.

Lee, Kang Young "Written Opinion", International App. No. PCT/US2010/055718, (Jun. 21, 2011),1-3.

Sonoda, et al., "Bibliographical Data and Abstract (English Translation)", Japanese Patent Application JP-59-75985, (Apr. 28, 1984),1-2.

Parsons, Thomas H., "Non Final Office Action", U.S. Appl. No. 12/022,381, (Sep. 16, 2011),1-17.

Parsons, Thomas H., "Final Office Action", U.S. Appl. No. 12/022,381, (Dec. 23, 2011),1-19.

Sakai, et al., "Bibliographical Data and Abstract", Espacenet English Language Abstract and bibliographical data for JP 07-282860, (Oct. 27, 1995),1-2.

(56) References Cited

OTHER PUBLICATIONS

Lee, Kang Y., "International Search Report", PCT application No. PCT/US2012/023541 (corresponding to U.S. Appl. No. 13/364,169, (Aug. 9, 2012),1-4.

Lee, Kang Y., "Written Opinion of the International Searching Authority", PCT application No. PCT/US2012/023541 (corresponding to U.S. Appl. No. 13/364,169, (Aug. 9, 2012),1-4.

* cited by examiner

NICKEL-METAL HYDRIDE/HYDROGEN HYBRID BATTERY USING ALKALI ION CONDUCTING SEPARATOR

RELATED APPLICATIONS

This application claims priority to, and the benefit of, provisional U.S. Patent Application No. 61/438,328 filed on Feb. 1, 2011, which was a continuation in part, and claimed priority to, and the benefit of, U.S. application Ser. No. 11/944,719 filed on Nov. 26, 2007 entitled Nickel-Metal Hydride Battery Using Alkali Ion Conducting Separator, issued on Sep. 6, 2011 as U.S. Pat. No. 8,012,621. This application is also a continuation in part of, and claims priority to, both U.S. application Ser. Nos. 13/189,176 and 13/189,177, each filed on Jul. 22, 2011, which applications were divisional applications of U.S. application Ser. No. 11/944,719, filed Nov. 26, 2007 now U.S. Pat. No. 8,012,621. U.S. application Ser. No. 13/189,176 issued on Apr. 17, 2012 as U.S. Pat. No. 8,159,192. U.S. application Ser. No. 13/189,177 issued on May 13, 2014 as U.S. Pat. No. 8,722,221. These applications and patents are incorporated herein by reference.

BACKGROUND OF THE INVENTION

This invention relates to a nickel-metal hydride/Hydrogen hybrid battery that includes a non-porous, alkali ion conducting separator.

Nickel-metal hydride storage batteries are widely used for the power sources of cordless electronic equipment, power tools, electric vehicles and the like. Conventional nickel-metal hydride batteries are composed of a positive electrode containing nickel hydroxide, a negative electrode containing a hydrogen-absorbing metal alloy, a microporous separator interposed between the positive and negative electrodes, and an electrolyte.

Nickel hydrogen battery (Ni—$H_2$) is a choice battery in many aerospace applications, especially geo-synchronous (GEO) and low earth-orbit (LEO) satellites. Recently, nickel-hydrogen batteries have also been used in terrestrial applications. The difference with a nickel-metal hydride battery is the use of hydrogen in a pressurized cell of up to 1200 psi (82.7 bar). The Ni—$H_2$ battery comprises a positive electrode containing nickel hydroxide, a negative hydrogen electrode utilizes a teflon-bonded platinum black catalyst, and a zirconia cloth separator. This battery has a long cycle life, high specific energy, high power density, and also exhibits tolerance for overcharge. Its disadvantages include an expensive initial cost, as well as low volumetric energy density.

Self-discharge is a phenomenon in many rechargeable batteries in which internal chemical reactions reduce the stored charge of the battery without any connection between the electrodes. Self-discharge decreases the shelf-life of batteries and causes them to have less charge than expected when actually put to use. How fast self-discharge in a battery occurs is dependent on the type of battery and temperature. Nickel-based batteries typically are significantly affected by self-discharge (nickel cadmium, 15-20% per month; nickel metal hydride, 30% per month; nickel hydrogen proportional to hydrogen pressure). Self-discharge is a chemical reaction and tends to occur more quickly at higher temperatures. Storing batteries at lower temperatures may reduce the rate of self-discharge and preserve the initial energy stored in the battery.

Without being bound by theory, it is believed the self-discharge problem associate with nickel metal hydride batteries is a result of hydrogen passing through the porous separator.

It would be an improvement in the art to provide a nickel metal hydride battery with reduced or limited self-discharge.

SUMMARY OF THE INVENTION

In accordance with the present invention, there is provided herein a nickel-metal hydride (hydrogen) hybrid battery that contains a positive electrode containing nickel hydroxide and a negative electrode containing a reversible hydrogen electrode. In one embodiment, the negative electrode is a combination electrode containing a hydrogen storage alloy electrode. The battery also contains a separator having a substantially non-porous alkali ion conducting material disposed between the positive electrode and the negative electrode.

In accordance with the present invention, there is also provided method of charging a nickel-metal hydride (hydrogen) hybrid battery having a positive electrode containing nickel hydroxide, a combination negative electrode containing a hydrogen storage alloy electrode and a reversible hydrogen electrode, an alkaline electrolyte, and a separator comprising a substantially non-porous alkali ion conducting material. In one embodiment, the method includes the steps of applying an electric charging potential to the positive and negative electrodes to cause the following reaction to occur at the positive electrode:

$$Ni(OH)_2 + MeOH \rightarrow NiOOH + H_2O + Me^+ + e^-$$

and to cause the following reactions to occur at the negative electrode:

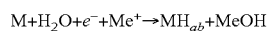
$$M + H_2O + e^- + Me^+ \rightarrow MH_{ab} + MeOH$$

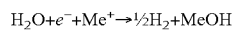
$$H_2O + e^- + Me^+ \rightarrow \tfrac{1}{2}H_2 + MeOH$$

M in the forgoing reactions may be a hydrogen absorbing alloy, $H_{ab}$ may be absorbed hydrogen, and Me may be an alkali metal.

The method may also include the step of conducting Me+ ions across the alkali ion conducting separator from the positive electrode to the negative electrode. In one embodiment, the positive electrode is the electrode bearing a positive charge on discharge and the negative electrode bears a negative charge on discharge.

In accordance with the present invention, there is also provided a method of discharging a nickel-metal (hydrogen) hybrid battery having a positive electrode containing nickel hydroxide, a combination negative electrode containing a hydrogen storage alloy electrode and a reversible hydrogen electrode, an alkaline electrolyte, and a separator comprising a substantially non-porous alkali ion conducting material. The method includes the step of generating an electric potential between the positive and negative electrodes due in part to the following reaction occurring at the positive electrode:

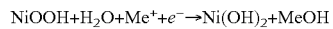
$$NiOOH + H_2O + Me^+ + e^- \rightarrow Ni(OH)_2 + MeOH$$

and due in part to the following reaction occurring at the negative electrode:

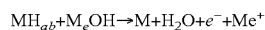
$$MH_{ab} + M_eOH \rightarrow M + H_2O + e^- + Me^+$$

$$\tfrac{1}{2}H_2 + MeOH \rightarrow H_2O + e^- + Me^+$$

In one embodiment, M is a hydrogen absorbing alloy, $H_{ab}$ is absorbed hydrogen, and Me is an alkali metal. The method includes the step of conducting $Me^+$ ions across the alkali ion conducting separator from the negative electrode to the positive electrode.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of cells, membranes, processes, methods, etc., to provide a thorough understanding of embodiments of the invention. One skilled in the relevant art will recognize, however, that the invention may be practiced without one or more of the specific details or method steps, or with other methods, components, materials, and so forth. In other instances, well-known structures, materials, or operations are not shown or described in detail to avoid obscuring aspects of the invention.

The embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the nickel-metal hydride battery using an alkali metal conducting separator within the scope of the present invention as represented in FIGS. 1 and 2, is not intended to limit the scope of the invention, as claimed, but is merely representative of the embodiments of the invention.

Figure 1:
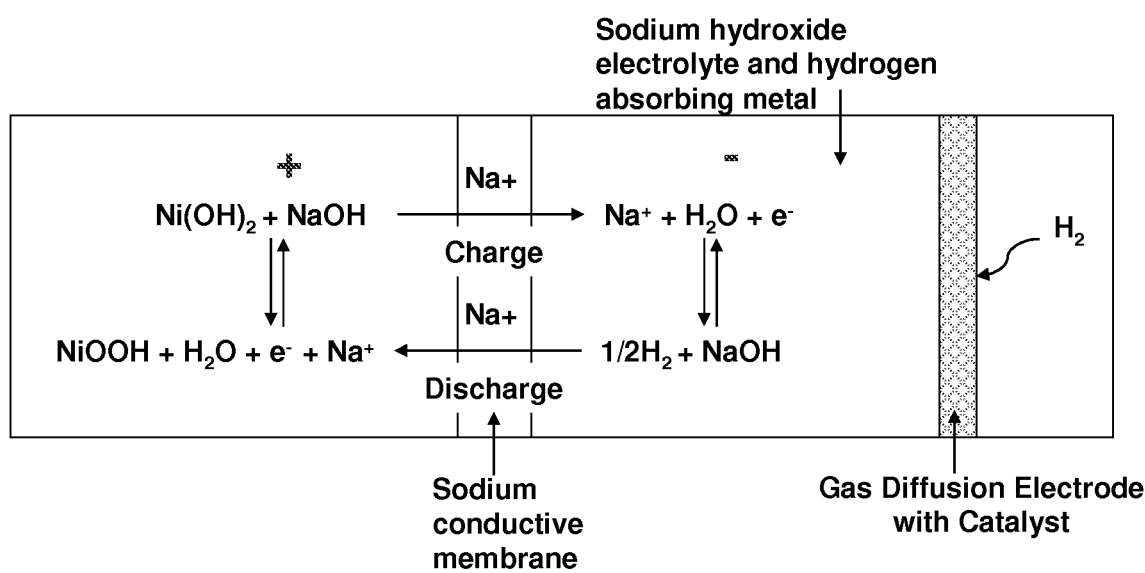
FIG. 1 is a schematic representation of one embodiment of a Ni-MH/$H_2$ hybrid battery within the scope of the invention.
Figure 2:
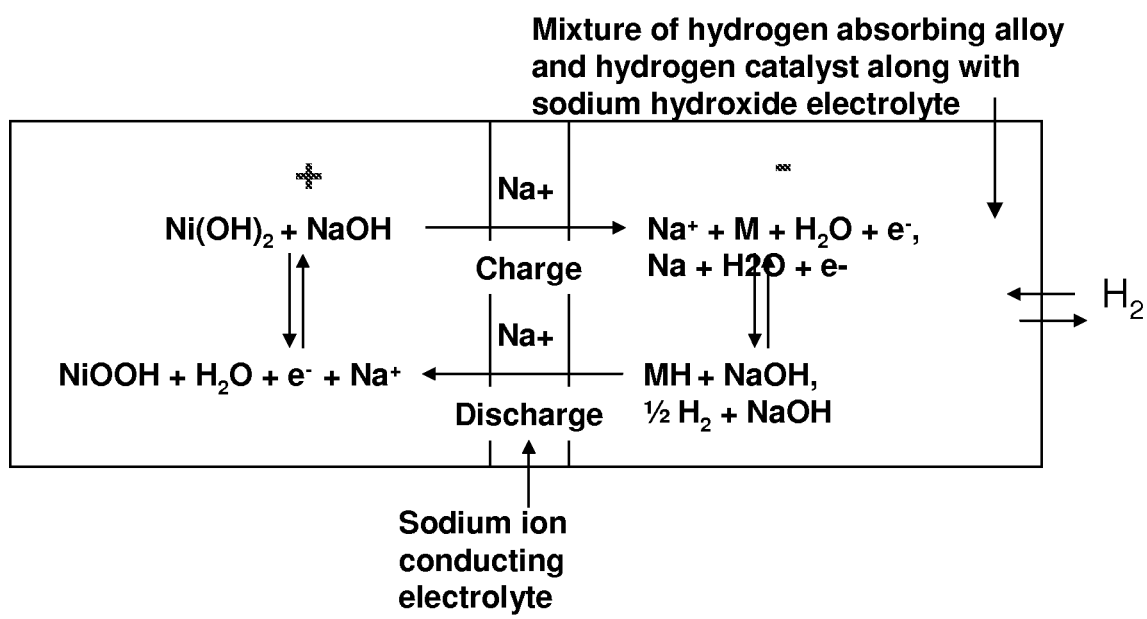
FIG. 2 is a schematic representation of another embodiment of a Ni-MH/$H_2$ hybrid battery within the scope of the invention.

Referring to FIG. 1, there is provided a schematic representation of a Ni-MH/$H_2$ hybrid battery within the scope of the invention. In this embodiment, battery includes a positive nickel hydroxide electrode, a negative electrode, and an alkali ion conducting separator. The battery also includes an alkaline electrolyte, such as an alkali metal hydroxide. The electrolyte may contain other minor constituents to enhance cell performance. The alkaline electrolytes may include by way of non-limiting example, sodium hydroxide, lithium hydroxide, sodium carbonate, lithium carbonate, and the like. In one embodiment, alkaline electrolytes may be positioned on either side of the separator and may be different from one another. The substantially non-porous nature of the separator allows for different electrolytes having different enhancers or constituents to be used on one side of the separator without effecting electrode performance on the other side of separator. Thus for example, different alkaline electrolytes having different alkalinities may be either side of the separator.

The positive electrode may comprise nickel hydroxide (Ni$(OH)_2$) or other materials used in conventional nickel-metal hydride batteries. In some embodiments, the positive electrode may be a pasted or sintered-type material.

The negative electrode in the present invention may contain a reversible hydrogen electrode. In another embodiment, the negative electrode is a combination of MH and $H_2$ electrodes, wherein different charge/discharge reactions happen at the respective electrodes.

FIG. 1 shows a combination cathode. The MH cathode is same as or similar to traditional Ni-MH battery cathode and the hydrogen cathode is a gas diffusion type of cathode.

The MH negative electrode may comprise a hydrogen-absorbing alloy. Such alloys are known in the art. Examples of early hydrogen-absorbing alloys include NiFe, $Mg_2Ni$, and $LaNi_5$. These hydrogen-absorbing alloys combine metal (A) whose hydrides generate heat exothermically with metal (B) whose hydrides generate heat endothermically to produce the suitable binding energy so that hydrogen can be absorbed and released at or around normal temperature and pressure levels. Depending on how metals A and B are combined, the alloys are classified into the following types: AB (TiFe, etc.), $AB_2$ ($ZnMn_2$, etc.), $AB_5$ ($LaNi_5$, etc.) and $A_2B$ ($Mg_2Ni$, etc.).

Of the foregoing general types of hydrogen absorbing metal alloys, two general classes of metallic alloys are identified as possessing characteristics desirable for battery cell use because of their good charge and discharge efficiency and durability. These are rare earth/nickel alloys generally based around $LaNi_5$ (the so-called $AB_5$ class of alloys) and alloys consisting primarily of titanium and zirconium (designated as $AB_2$ alloys). In both cases, some fraction of the base metals is often replaced with other metallic elements. The $AB_5$ formulation appears to offer the best set of features for commercial nickel-metal hydride cell applications. The metal hydride electrode has a theoretical capacity approximately 40 percent higher than the cadmium electrode in a nickel-cadmium couple. As a result, nickel-metal hydride cells provide energy densities that are 20-40 percent higher than the equivalent nickel-cadmium cell.

The reversible hydrogen electrode comprises a catalyst comprising platinum dispersed on a carbon in the form of a gas diffusion electrode. The catalyst may be a platinum-type electro catalyst. Gas diffusion electrodes are used in chlor-alkali electrolysis, metal-air batteries, and fuel cells. In one embodiment, the reversible hydrogen may be a gas diffusion electrode that interfaces with an alkaline electrolyte and a gaseous phase for electrochemical oxidation of hydrogen, the gas diffusion electrode comprising at least one reaction layer having dispersed therein a platinum-type catalyst, wherein the reaction layer is in fluid communication with the alkaline electrolyte and wherein the gas diffusion layer is in fluid communication with a gas comprising hydrogen.

A gas diffusion electrode has a multilayer structure composed of a gas diffusion layer, a reaction layer, and a current collector for electrical connection. Gas phase hydrogen is exposed to the gas diffusion layer. The reaction layer resides between the gas diffusion layer and the electrolyte. After passing through the gas diffusion layer, hydrogen is consumed through a reduction reaction (on discharge) on an hydrogen reduction catalyst in the reaction layer.

The gas diffusion layer is required to allow the hydrogen to pass there through rapidly and to diffuse uniformly into the entire reaction layer. The gas diffusion layer is also required to prevent the electrolyte from permeating to the gas phase. The gas diffusion layer is comprised of a material formed of carbon particles bonded to each other with a material, such as polytetrafluoroethylene, having high water repellent properties. The gas diffusion layer must also conduct electrons from the current collector to the reaction layer.

The reaction layer contains uniformly dispersed hydrogen reduction catalyst particles in electronic continuity with the gas diffusion layer and current collector. In the reaction layer, a large interface area is formed among the oxygen, electrolyte, electrons, and the oxygen reduction catalyst.

Mainly noble metals such as platinum and silver, dispersed in or supported on carbon black in the reaction layer, have been used and investigated as hydrogen reduction catalysts for concentrated alkaline solution.

The current collector may be, for example, a wire mesh or a foam material, which is composed of nickel, silver, or the like.

FIG. 1 shows that the negative electrode is made by placing the reversible hydrogen electrode adjacent to the hydrogen storage alloy electrode such that the reaction layer of the reversible hydrogen electrode is facing the hydrogen storage alloy electrode and the gas diffusion layer is facing the hydrogen gas.

Also understood is that the advantages of the present invention described herein also apply to a Ni—$H_2$ battery without metal absorbing anode but with a substantially reversible hydrogen electrode with an alkaline conductive separator between anode and cathode, with sufficient alkali metal electrolyte to carry the current across the membrane with each charge and discharge. This embodiment is partially depicted in FIG. 1 except in this embodiment there is no hydrogen absorbing metal and the negative electrode.

FIG. 2 shows a second embodiment where the hydrogen absorbing alloy electrode material is combined with the reversible hydrogen electrode material to form the combination negative electrode. One way to form the combination negative electrode is to mix hydrogen absorbing alloy electrode material (mischmetal) with the platinum black catalyst (for reversible hydrogen reaction) and the alkaline electrolyte to form the combination negative electrode or anode as a unitary component. Alternatively the platinum black and/or the alkaline electrolyte may be dispersed on the hydrogen absorbing alloy electrode material (mischmetal) itself. In yet another embodiment, the combination negative electrode comprises hydrogen storage alloy material, an alkaline electrolyte, and the reaction layer material of the reversible hydrogen electrode. In yet another embodiment, the combination negative electrode includes the hydrogen storage alloy material, the alkaline electrolyte and the materials from both gas diffusion and reaction layers of the reversible hydrogen electrode mixed and formed into a single component. Another way to form the combination negative electrode is to mix hydrogen absorbing alloy electrode material (mischmetal) with the reaction layer material of the gas diffusion electrode (for reversible hydrogen reaction) and the alkaline electrolyte to form the combined anode. The mixtures or combinations of these embodiments may be homogeneous or nonhomogeneous. Accordingly, the hydrogen storage alloy electrode reversibly absorbs hydrogen. Thus, the terms hydrogen storage alloy electrode and hydrogen absorbing alloy electrode may be used interchangeably herein throughout as context permits.

The charge and discharge reactions for nickel-metal hydride (hydrogen) hybrid battery within the scope of the invention, using sodium as a representative alkali metal, are shown below:

| Positive electrode: | $Ni(OH)_2 + NaOH \rightarrow NiOOH + H_2O + Na^+ + e^-$ | (charge) |
|---|---|---|
| | $NiOOH + H_2O + Na^+ + e^- \rightarrow Ni(OH)_2 + NaOH$ | (discharge) |
| Negative electrode: | $M + H_2O + e^- + Na^+ \rightarrow MH_{ab} + NaOH$ | (charge) |
| Negative electrode: | $H_2O + e^- + Na^+ \rightarrow \frac{1}{2}H_2 + NaOH$ | (charge) |
| | $MH_{ab} + NaOH \rightarrow M + H_2O + e^- + Na^+$ | (discharge) |
| | $\frac{1}{2}H_2 + NaOH \rightarrow H_2O + e^- + Na^+$ | (discharge) |

Overall reaction for the Ni-MH portion of the battery is:

$$Ni(OH)_2 + M \rightarrow NiOOH + MH_{ab} \text{ (charge)}$$

$$NiOOH + MH_{ab} \rightarrow Ni(OH)_2 + M \text{ (discharge)}$$

Where M is a hydrogen absorbing alloy and $H_{ab}$ is absorbed hydrogen.

Overall reaction for the Ni—$H_2$ portion of the battery is:

$$Ni(OH)_2 \rightarrow NiOOH + \tfrac{1}{2}H_2 \text{ (charge)}$$

$$NiOOH + \tfrac{1}{2}H_2 \rightarrow Ni(OH)_2 \text{ (discharge)}$$

Accordingly, the reversible hydrogen anode oxidizes hydrogen to water during charge and reduces water back to hydrogen during discharge.

The capacity distribution between the two negative electrodes may be adjusted so that the either of the charge/discharge reactions for Ni-MH or Ni—$H_2$ are predominant. This means that one of the negative electrode possesses a greater capacity than the other. It may be that one of the negative electrode will reach full capacity first as the cell is charged/discharged before the other one. Thus in one embodiment, the hydrogen storage alloy electrode and the reversible hydrogen electrode have different charge storage capacities.

In accordance with the present invention, there is provided herein a nickel-metal hydride (hydrogen) hybrid battery that contains an alkali ion conducting separator configured to selectively transport alkali ions. The nickel-metal hydride (hydrogen) combination battery is structurally similar to conventional nickel-metal hydride and nickel-hydrogen batteries and contains a positive electrode and a negative electrode. One difference between the traditional Ni-MH and Ni—$H_2$ compared to the present battery is that an alkali ion conducting separator is disposed between the positive and negative electrodes. The separator may be substantially non-porous.

The separator in one embodiment is an alkali ion conducting solid electrolyte configured to selectively transport alkali ions. It may be a specific alkali ion conductor. For example, the separator may be a solid MeSICON (Metal Super Ion CONducting) material, where Me is Na, K, Li or a combination thereof. The alkali ion conducting separator may comprise a material having the formula $Me_{1+x}Zr_2Si_xP_{3-x}O_{12}$ where $0 \leq x \leq 3$, and where Me is Na, K, Li or a combination thereof. Other alkali ion conducting solid electrolytes may comprise a material having the formula $Me_5RESi_4O_{12}$ where Me is Na, K, Li or combinations thereof, and where RE is Y, Nd, Dy, Sm, or any mixture thereof. The alkali ion conducting separator may comprise a non-stoichiometric alkali-deficient material having the formula $(Me_5RESi_4O_{12})_{1-\delta}(RE_2O_3 \cdot 2SiO_2)_\delta$, where Me is Na, K, Li, or a combination thereof, where RE is Nd, Dy, Sm, or any mixture thereof, and where δ is the measure of deviation from stoichiometry. In one embodiment, the separator comprises a material having the formula $Na_{1+x}Zr^2Si_xP_{3-x}O_{12}$ where 0≤x≤3. The alkali ion conducting separator may also be beta-alumina.

The alkali ion conducting separator may be configured in the form of a monolithic flat plate, a monolithic tube, a monolithic honeycomb, or supported structures of the foregoing. The alkali ion conducting separator may be a flexible sheet of the polymer configured in various forms applicable to the intended application. The alkali ion conducting separator may be a flexible sheet composed of a mixture of polymer and ceramic and configured in a variety of forms. The alkali ion conducting separator may be configured as a layered alkali ion conducting ceramic-polymer composite membrane comprising alkali ion selective polymers layered on alkali ion conducting ceramic solid electrolyte materials.

In the present battery using the alkali metal ion conducting separator, the current carrying species in the electrolyte are exclusively alkali metal ions. Also the concentrations of the electrolyte change at both electrodes during battery operation because the non porous separator prevents mixing of electrolyte from both the compartments. This advantageously prevents transport of unwanted species from one electrode to the other and substantially eliminates capacity loss and self discharge. In one embodiment of the invention, the separator is a substantially non-porous ceramic separator material. The substantially non-porous ceramic separator material may include pockets of porosity, but it should not have "through-porosity." "Substantially non-porous" in some embodiments, means less than or equal to 5% porosity. The substantially non-porous separator is preferably hermetic or gas-impermeable. However, the substantially non-porous separator used within the scope of the present invention may possess a trace amount of through porosity and/or gas permeability. The term substantially non-porous is intended to differentiate the prior art separators that are substantially porous.

The separator conducts alkali ions, but is substantially impermeable to hydrogen. The term "substantially impermeable to hydrogen" means that the separator is greater than or equal to 95% impermeable to hydrogen. Without being bound by theory, it is presently believed that self-discharge of the nickel-metal hydride and nickel-hydrogen batteries may be substantially reduced or eliminated by preventing hydrogen from passing from the negative electrode to the positive electrode. The solid electrolyte separator being non porous prevents any hydrogen transport to the positive electrode while the polymer separator will allow some diffusion of hydrogen although lower than a microporous separator commonly used in the prior art. The Ni-MH/$H_2$ hybrid battery within the scope of the present invention can be stored and used at higher temperature than the prior art because of the minimal self discharge.

The combination of highly reversible hydrogen negative electrode and hydrogen storage alloy electrode should result in longer charge/discharge cycle life than conventional Ni-MH battery. The presence of substantially hydrogen impermeable solid electrolyte separator prevents hydrogen consumption at the positive electrode and therefore the battery should have a longer shelf-life than conventional Ni-MH or Ni—$H_2$ batteries In some embodiments, the nickel-metal hydride battery may be operated at temperatures from about −40° C. to about 120° C.

A method of charging a nickel-metal hydride (hydrogen) hybrid battery having a positive electrode containing nickel hydroxide, a combination negative electrode containing a hydrogen storage alloy electrode and a reversible hydrogen electrode, an alkaline electrolyte, and a separator comprising a substantially non-porous alkali ion conducting material includes the steps of applying an electric charging potential to the positive and negative electrodes to cause the following reaction to occur at the positive electrode:

$$Ni(OH)_2 + MeOH \rightarrow NiOOH + H_2O + Me^+ + e^-$$

and to cause the following reactions to occur at the negative electrode:

$$M + H_2O + e^- + Me^+ \rightarrow MH_{ab} + MeOH$$

$$H_2O + e^- + Me^+ \rightarrow \tfrac{1}{2}H_2 + MeOH$$

M in the forgoing reactions may be a hydrogen absorbing alloy, $H_{ab}$ may be absorbed hydrogen, and Me may be an alkali metal.

The method may also include the step of conducting $Me^+$ ions across the alkali ion conducting separator from the positive electrode to the negative electrode. In one embodiment, the positive electrode is the electrode bearing a positive charge on discharge and the negative electrode bears a negative charge on discharge.

A method of discharging a nickel-metal (hydrogen) hybrid battery having a positive electrode containing nickel hydroxide, a combination negative electrode containing a hydrogen storage alloy electrode and a reversible hydrogen electrode, an alkaline electrolyte, and a separator comprising a substantially non-porous alkali ion conducting material includes the step of generating an electric potential between the positive and negative electrodes due in part to the following reaction occurring at the positive electrode:

$$NiOOH + H_2O + Me^+ + e^- \rightarrow Ni(OH)_2 + MeOH$$

and due in part to the following reaction occurring at the negative electrode:

$$MH_{ab} + M_eOH \rightarrow M + H_2O + e^- + Me^+$$

$$\tfrac{1}{2}H_2 + MeOH \rightarrow H_2O + e^- + Me^+$$

In one embodiment, M is a hydrogen absorbing alloy, $H_{ab}$ is absorbed hydrogen, and Me is an alkali metal. The method includes the step of conducting $Me^+$ ions across the alkali ion conducting separator from the negative electrode to the positive electrode.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

The invention claimed is:

1. A nickel-metal hydride (hydrogen) hybrid battery comprising:
   a positive electrode comprising nickel hydroxide;
   a combination negative electrode comprising a hydrogen storage alloy electrode and a reversible hydrogen electrode; and
   a separator comprising a substantially non-porous solid alkali metal ion super ion conducting material disposed between the positive electrode and the negative electrode, wherein the alkali metal ion is Na, K, Li, or combinations thereof.

2. The nickel-metal hydride (hydrogen) hybrid battery according to claim 1, wherein the separator comprises a substantially non-porous ceramic material.

3. The nickel-metal hydride (hydrogen) hybrid battery according to claim 1, wherein the separator comprises a material having the formula $Me_{1+x}Zr_2Si_xP_{3-x}O_{12}$ where $0 \leq x \leq 3$, and where Me comprises Na, K, Li or any combination thereof.

4. The nickel-metal hydride (hydrogen) hybrid battery according to claim 3, wherein the separator comprises a material having the formula $Na_{1+x}Zr_2Si_xP_{3-x}O_{12}$ where $0 \leq x \leq 3$.

5. The nickel-metal hydride (hydrogen) hybrid battery according to claim 1, wherein the separator comprises a material having the formula $Me_5RESi_4O_{12}$ where Me comprises Na, K, Li or any combinations thereof, where RE comprises Y, Nd, Dy, Sm, or any combination thereof.

6. The nickel-metal hydride (hydrogen) hybrid battery according to claim 1, wherein the separator comprises a non-stoichiometric alkali-deficient material having the formula $(Me_5RESi_4O_{12})_{1-\delta}(RE_2O_3 \cdot 2SiO_2)_\delta$, where Me comprises Na, K, Li, or combinations thereof, where RE comprises Nd, Dy, Sm, or combinations thereof and where $\delta$ is the measure of deviation from stoichiometry.

7. The nickel-metal hydride (hydrogen) hybrid battery according to claim 1, wherein the separator comprises a monolithic flat plate, a monolithic tube, a monolithic honeycomb, or supported structures of the foregoing.

8. The nickel-metal hydride (hydrogen) hybrid battery according to claim 1, wherein the separator comprises a layered alkali ion conducting ceramic-polymer composite membrane, comprising alkali ion-selective polymers layered on alkali ion conducting ceramic solid electrolyte materials.

9. The nickel-metal hydride (hydrogen) hybrid battery according to claim 1, wherein the separator is substantially impermeable to hydrogen.

10. The nickel-metal hydride (hydrogen) hybrid battery according to claim 1, further comprising an alkaline electrolyte.

11. The nickel-metal hydride (hydrogen) hybrid battery according to claim 10, wherein alkaline electrolytes are positioned on either side of the separator.

12. The nickel-metal hydride (hydrogen) hybrid battery according to claim 11, wherein alkaline electrolytes are different.

13. The nickel-metal hydride (hydrogen) hybrid battery according to claim 1, wherein the hydrogen storage alloy electrode comprises a mixture of hydrogen storage alloy and electrolyte.

14. The nickel-metal hydride (hydrogen) hybrid battery according to claim 10, wherein the reversible hydrogen electrode comprises a gas diffusion electrode that interfaces with the alkaline electrolyte and a gaseous phase for electrochemical oxidation of hydrogen.

15. The nickel-metal hydride (hydrogen) hybrid battery according to claim 14, wherein the gas diffusion electrode comprises at least one reaction layer having dispersed therein a catalyst comprising platinum, wherein the at least one reaction layer is in fluid communication with the alkaline electrolyte and wherein the gas diffusion layer is in fluid communication with a gas comprising hydrogen.

16. The nickel-metal hydride (hydrogen) hybrid battery according to claim 15, wherein the reversible hydrogen electrode is positioned adjacent to the hydrogen storage alloy electrode such that the reaction layer of the reversible hydrogen electrode is facing the hydrogen storage alloy electrode and the gas diffusion layer is facing the hydrogen gas.

17. The nickel-metal hydride (hydrogen) hybrid battery according to claim 1, wherein the hydrogen storage alloy electrode and the reversible hydrogen electrode have different charge storage capacities.

18. The nickel-metal hydride (hydrogen) hybrid battery according to claim 1, wherein the combination negative electrode comprises hydrogen storage alloy electrode material, an alkaline electrolyte, and a platinum catalyst.

19. The nickel-metal hydride (hydrogen) hybrid battery according to claim 18, wherein the combination negative electrode is unitary component.

20. The nickel-metal hydride (hydrogen) hybrid battery according to claim, 1 wherein the combination negative electrode comprises a platinum catalyst and an alkaline electrolyte dispersed onto the hydrogen storage alloy material.

21. The nickel-metal hydride (hydrogen) hybrid battery according to claim 15, wherein the combination negative electrode comprises hydrogen storage alloy material, an alkaline electrolyte, and reaction layer material of the reversible hydrogen electrode.

22. The nickel-metal hydride (hydrogen) hybrid battery according to claim 15, wherein the combination negative electrode comprises hydrogen storage alloy material, an alkaline electrolyte and the materials from the gas diffusion electrode and the reaction layer of the reversible hydrogen electrode.

* * * * *